United States Patent [19]

Atwood et al.

[11] Patent Number: 4,692,252

[45] Date of Patent: Sep. 8, 1987

[54] METHOD OF REMOVING SCALE FROM WET OXIDATION TREATMENT APPARATUS

[75] Inventors: Mark T. Atwood, Arvada; Frank Carlson, Broomfield; Hermann Peterscheck, Longmont, all of Colo.

[73] Assignee: VerTech Treatment Systems, Inc., Denver, Colo.

[21] Appl. No.: 843,461

[22] Filed: Mar. 24, 1986

[51] Int. Cl.$^4$ ................................................. C02F 1/74
[52] U.S. Cl. ........................................ 210/761; 134/3; 134/22.13; 134/28; 134/29; 134/41
[58] Field of Search ................. 134/2, 3, 22.13, 22.17, 134/28, 29, 40, 41; 210/696, 761, 762

[56] References Cited

U.S. PATENT DOCUMENTS

| 3,072,502 | 1/1963 | Alfano | 134/27 |
|---|---|---|---|
| 3,522,093 | 7/1970 | Woolman | 134/41 |
| 4,139,461 | 2/1979 | Bauer | 210/761 |
| 4,272,383 | 6/1981 | McGrew | 210/761 |
| 4,328,106 | 5/1982 | Harrar et al. | 210/700 |

FOREIGN PATENT DOCUMENTS

| 0464773 | 7/1975 | U.S.S.R. | 134/3 |
|---|---|---|---|
| 0700774 | 11/1979 | U.S.S.R. | 134/3 |

*Primary Examiner*—Peter Hruskoci
*Attorney, Agent, or Firm*—Cullen, Sloman, Cantor, Grauer, Scott & Rutherford

[57] ABSTRACT

A method of removing scale from the surfaces of a fluid treatment apparatus by directing a base solution and an acid solution through the fluid treatment apparatus. The fluid treatment apparatus cleaned by the method of the present invention is a vertical tube wet oxidation treatment apparatus in which an aqueous slurry of organic materials is oxidized in a tube which extends deep into the surface of the earth. Water rinses are performed between the steps of circulating the aqueous base solution, circulating the aqueous acid solution, and operating the fluid treatment apparatus. The water used for separating the sequential steps is preferably buffered water. The aqueous acid solution is preferably a mineral acid and most preferably nitric acid. The aqueous base solution is preferably potassium hydroxide or sodium hydroxide. The method also contemplates a sectional wash of the apparatus by directing a base or acid solution partially into the apparatus.

23 Claims, No Drawings

METHOD OF REMOVING SCALE FROM WET OXIDATION TREATMENT APPARATUS

BACKGROUND OF THE INVENTION

I. Technical Field

This invention relates to a method of removing scale from the surfaces of a vertical tube reaction apparatus, including the downcomer and upcomer pipe walls, which contact the aqueous phase waste stream treated by the apparatus. The method comtemplated herein provides for either complete or partial washing of the system.

II. Description of the Background Art

Innovative vertical tube wet oxidation reaction systems are currently being developed to process various organic materials in an acqueous phase. In the wet oxidation process, complex organic materials in an aqueous phase are converted into water, carbon dioxide, dilute organic acids and a small amount of sterile inert ash.

The chemical reaction occurs within a series of vertical concentric tubes which generally extend downwardly into the ground to a depth of from 3,000 feet to 6,000 feet. The fluid to be treated is pumped into one annulus, i.e., the downcomer, formed by adjacent concentric tubes with other reactants for the chemical reaction wherein a fluid head creates pressure and heat is added which facilitates the reaction. The temperature and pressure are greatest in the lower regions of the tubes where the reaction occurs. Following the reaction, the fluid continues its continuous flow upwardly through a second annulus, i.e., the upcomer, where the effluent may be processed further. One example of the chemical reaction is the wet oxidation of municipal wastewater treatment sludges. Oxygen, or air, is added to the influent flow of municipal wastewater treatment sludge which is wet oxidized to form water, carbon dioxide, dilute organic acids and inert ash.

The tubes are preheated and temperature controlled by means of a heat exchange system as disclosed in U.S. Pat. No. 4,272,383 of Dr. McGrew, entitled "Method and Apparatus for Effecting Subsurface, Controlled, Accelerated Chemical Reactions", assigned to the assignee of the present invention, the disclosure of which is hereby incorporated by reference.

A key to the commercial success of such vertical tube reaction systems is their energy efficiency realized by applying the natural principles of gravity and thermodynamics to create the heat and pressure required to sustain the reaction.

Wet oxidation of the fluid waste stream occurs in the aqueous phase when sufficient oxygen, heat and pressure are present in the system. The wet oxidation reaction is an exothermic reaction which is capable of autogenic operation after the lower portion or reaction zone of the vertical tubes are preheated to the appropriate temperature for oxidation of the waste stream, generally between 300° F. and 600° F.

The efficiency of this system is also seen in the fact that the pumps injecting the fluid waste stream theoretically only need be large enough to overcome the wall friction and any differential head between the influent and effluent tubes. The vertical tubes are designed to provide sufficient residence time of the fluid waste stream in the reaction zone to complete the oxidation reactions. In the preferred arrangement, the influent and effluent flow paths of the fluid waste stream are separated by a single tube which creates an extremely efficient counterflow heat exchange between the influent and effluent wherein the influent draws heat from the effluent as the influent flows toward the reaction zone.

To maintain the extraordinary efficiencies of the system, it is vital that the walls of the tubes remain substantially free of inorganic scale and that no other accumulations or plugging occur. Scale build-up on the walls of the tubes increases the wall friction and reduces the available cross-sectional area through which the fluid waste stream may flow, thereby increasing the load on the pump circulating the fluid waste stream.

Scale build-up on the walls of the vertical tubes also reduces the efficiency of the counterflow heat exchange between the influent and effluent through the walls of the tubes separating the two flows. Similarly, scale accumulations on the wall of the tube adjacent the heat exchange medium reduces the efficiency of preheating the reaction zone.

One problem to which the present invention is directed is the build-up of layers of inorganic scale on the tube surfaces and plugging of the downcomer with organic material. The scale is in part hard anhydrite scale which is comprised of calcium sulfate ($CaSO_4$). In the environment of the wet oxidation treatment apparatus, severe pyrolysis, hydrolysis and oxidation reactions occur. In this environment, the retrograde solubility of calcium sulfate results in the precipitation of the calcium sulfate and formation of the anhydrite scale on the tube surfaces which are hottest. With calcium sulfate and other substances which are subject to retrograde solubility, as the heat of a solution increases the solubility decreases. Thus, in the reaction zone, which is at a temperature of approximately 500° F. to 600° F., a certain quantity of calcium sulfate will precipitate out of the solution.

The formation of anhydrite hard scale in water distillation devices has long been a problem requiring periodic boil out of distillation devices with deionized water. This approach is not appropriate for use in wet oxidation treatment apparatus due to the degree of scale build-up of substances having retrograde solubility at the extremely high temperatures encountered in the reaction zone comprising portions of the vertical tubes at a depth of more than 3,000 feet.

Mineral acid-type scale removers currently recommended for machine cleaning are relatively ineffective on anhydrite or silicate scales and used alone do not provide the necessary de-scaling action. Alkali cleaners are ineffective on mineral carbonates which also form a component of the scale build-up in the wet oxidation treatment apparatus. Other commercially available descalers have been tried to eliminate the scale build-up in the wet oxidation treatment apparatus, however they are either subject to degradation in the high temperatures of the reaction zone or they are excessively corrosive, which would reduce the useful life of the wet oxidation treatment apparatus.

Another problem to which the present invention is the organic and inorganic scaling and resulting plugging of the upper section of the reaction vessel in the downcomer. The formation of plugs in this area greatly increases the pressure drop across the reaction vessel, thereby requiring cleaning before the process can continue effectively.

SUMMARY OF THE INVENTION

The method of removing scale build-up provided by this invention is surprisingly well adapted to utilization in a vertical tube wet oxidation treatment apparatus. The method comprises successively introducing into either the downcomer or upcomer various combinations of an acid solution, a base or alkali solution, and water in the flow path through which the fluid waste stream is processed during an interruption in the processing of the fluid waste stream.

Removal of anhydrite scale is effected by first pumping the alkali solution through the normal flow path of the apparatus at a rate of displacement sufficient to permit the alkali solution to convert the anhydrite ($CaSO_4$) to calcium hydroxide ($Ca(OH)_2$) and dissolve the complex silicate portions of the scale deposits. The alkali solution is displaced from the apparatus and the acid solution is then introduced into the apparatus to dissolve the $Ca(OH)_2$ and any mineral carbonate scale deposits on the apparatus.

This surprisingly effective scale removal technique of the present invention is based in part upon the improved effectiveness of the alkali solution as it is heated to the temperatures and pressures existing in the reaction zone of the vertical tube wet oxidation treatment apparatus. The anhydrite scale is effectively converted into $Ca(OH)_2$ by the hot alkali solution. Likewise, the effectiveness of the acid solution on the $Ca(OH)_2$ and the mineral carbonates is intensified as a result of the heat and pressure acting on the acid solution.

The method of the present invention may also include a water rinse between successive steps to minimize neutralization of the acid solution by the alkali solution and vice-versa. Also the use of a water rinse prior to introduction of the first de-scaling step and following the last de-scaling step minimizes interference with normal fluid treatment and permits reuse of the acid and base solutions, if desired.

Various modes of circulation and sequencing are contemplated for the descaling process of the present invention. The alkali, acid or water may be directed downwardly through the downcomer and upwardly through the upcomer to a surface reservoir or the descaling materials may be directed downwardly through the upcomer and upwardly through the downcomer to the surface reservoir. Alternatively, the flow of the solutions may be reversed or continuously circulated in a loop through the downcomer and upcomer. Thus, the present invention contemplates a method where the descaling solution is directed downwardly through either the downcomer or upcomer, the descaling solution is directed downwardly through either the downcomer or upcomer and then the flow is reversed, or the descaling solution is continuously circulated in a loop through the downcomer and upcomer.

The acid used in the present invention is preferably a strong mineral acid with the most preferred acid being nitric acid. Other mineral acids which may be used in the present invention include hydrochloric acid (HCl) or perchloric acid ($HClO_4$). Hydrochloric acid is not as preferred as nitric acid due to its greater corrosive properties. Although sulfuric acid may be used in some applications, it is not preferred due to the fact that the anhydrite scale includes a sulfate component.

The aqueous alkali, or base, solution may include any one of a number of bases but the preferred base solution is sodium hydroxide or potassium hydroxide due to their effectiveness and low cost.

Further, a dilute caustic of a concentration of approximately 10% has been found effective to remove organic scale such as grease, hair, paper, etc., when utilizing a sectional wash in the downcomer between the surface and approximately 1,000–3,000 feet down into the reaction vessel. This technique provides the advantage of an inexpensive and relatively quick way of removing organic scale where plugging typically occurs thereby minimizing downtime due to a pressure drop across the reaction vessel.

Other advantages and meritorious features of this invention will be more fully understood from the following description of the preferred embodiments, the appended claims, and the detailed description of the preferred method of the invention which follows.

DETAILED DESCRIPTION OF THE INVENTION

The vertical tube reaction apparatus to which the present method is applied may be used to process waste streams from municipal sludge, pulp and paper manufacturing, industrial and petrochemical waste application and others. While different fluid waste streams have different requirements in relation to further treatment required, degree of oxidation reaction required and tendencies to form different types of scale, a common problem for such fluid treatment systems is the formation of anhydrite scale on the hot metal surfaces of the vertical tube reaction apparatus. The fluid waste stream from a municipal wastewater treatment system is an aqueous solution containing various ions of calcium, silicon and other mineral carbonates. The presence of calcium and sulfate ions in the fluid waste stream results in the formation of anhydrite scale at the high temperatures existing in the reaction zone of the fluid treatment apparatus. Anhydrite ($CaSO_4$) has the property of retrograde solubility wherein at temperatures of 500° F. to 600° F. occuring in the reaction zone, even a minute quantity of calcium sulfate ($CaSO_4$) will precipitate out of the solution and form hard anhydrite scale on the hot metal surfaces.

The process considerations important to effective and efficient operation of the fluid treatment apparatus indicate that the energy used to operate the system and cost of maintenance must be kept to a minimum. The time required for de-scaling the components of the system must be minimized. Also, the material used to remove scale must not cause excessive corrosion of the tubes of the fluid treatment apparatus. Finally, the effluent of the system must not include objectionable toxic or otherwise undesirable chemical constituents that would cause problems and require additional processing steps.

In view of the nature of the types of scale to be removed and the above process considerations, the method of the present invention for removing inorganic and organic scale from the treatment apparatus comprises the steps of interrupting the influent flow of the fluid waste stream into the fluid treatment apparatus. Interruption of the influent flow is accomplished by closing the valve in the influent supply line as disclosed in U.S. Pat. No. 4,272,383 to McGrew. During the time that the influent flow is interrupted, the fluid waste to be treated by the system may be accumulated in an accumulation tank. The time available for the de-scaling operation is limited by the volume of the holding tank as is readily apparent.

If the primary constituent of the scale to be removed is in part anhydrite scale ($CaSO_4$), it is preferred that the initial wash be a base solution, preferably a 10 percent by volume solution of sodium hydroxide (NaOH), liquid caustic, which is pumped into the fluid treatment apparatus, preferably in the influent port of the apparatus. The base solution is pumped through the apparatus and permitted to remain in contact with the surfaces to be de-scaled for a sufficient length of time to permit conversion of the anhydrite deposits to calcium hydroxide. The base solution also is effective in removing complex silicate and aluminum compound deposits found in the fluid treatment apparatus. After converting the anhydrite and removing the complex silicates and aluminum compounds, the base solution may be cycled through the path of the fluid waste stream, preferably to a storage tank.

The acid solution is then pumped into the influent port of the apparatus, through the apparatus, and is permitted to remain in contact with the surface to be cleaned a sufficient length of time to dissolve the $Ca(OH)_2$. The acid solution comprises a strong mineral acid such as nitric acid, hydrochloric acid, perchloric acid and combinations thereof, but preferably nitric acid. In the most preferred embodiment, a ten percent nitric acid solution is used. The nitric acid combines with the calcium hydroxide to form calcium ions, nitrate ions and water. The acid is also effective in dissolving mineral carbonates, phosphates, fluorides, magnesium compounds and accumulations of organic material that may be found in the fluid treatment apparatus.

Depending upon the extent of scale build-up, the steps of circulating the base solution and acid solution may be repeated until the scale is removed or at least reduced to an acceptable level. It is generally preferred to clean the fluid treatment apparatus completely as evidenced by subsequent flow capacity.

As described, flow resistance through the reaction vessel may also be impaired by an accumulation of organic material such as grease, hair, paper, etc., which forms plugs commonly in the downcomer of the vessel. It has been found that if a sectional wash is used consisting of a dilute caustic, such as a 10% by volume solution of sodium hydroxide, which is pumped into the vessel inlet (downcomer) to a depth of approximately 1,000–3,000 feet while being heated, the caustic will dissolve the organic materials and some of the metal salts. Flow is then reversed to remove the caustic and dissolved scale materials. A follow-up mineral acid solution may then be pumped into the downcomer to dissolve calcium, magnesium, phosphates, etc., as described above. However, it has been found that a sectional washing using only the dilute caustic reduced the pressure drop across the reaction vessel by approximately 50–60%, and therefore, the follow-up acid wash would not normally be necessary.

The descaling process of the present invention may be effected in several ways. First, the caustic or acid is directed downwardly through the downcomer or upcomer of the reaction vessel and, after sufficient residence time, cycled to a storage tank. Normally, the caustic would be cycled through the reaction vessel first with the acid being cycled through the vessel afterwards. A water rinse is used between the successive caustic and acid cycling to minimize neutralization of the acid by the caustic or vice versa. Further, a water rinse has been used prior to the introduction of the caustic and following the acid cycling to minimize interference with normal waste fluid treatment in the vessel. Another technique consists of directing caustic through the reaction vessel followed by water until the caustic partially exits the vessel at which time the flow is reversed and water is added in the reverse direction followed by acid. Water is then added again behind the acid in the reverse direction until the acid partially exits the vessel. The direction of flow is again reversed thereby permitting the slugs of caustic, water and acid to be cycled through the vessel in alternate forward and backward flow as desired. Finally, the slugs of caustic, water and acid may be circulated continuously in a loop, i.e., down the downcomer and up the upcomer, or down the upcomer and up the downcomer.

EXAMPLES

The method of removing inorganic and organic scale from surfaces of a vertical tube reaction apparatus having a plurality of concentric tubes extending vertically downward into the earth to a depth of more than 5,000 feet is explained below. The vertical tube reaction apparatus cleaned by the method of the present invention was used to process municipal waste sludge by a wet oxidation reaction. The aqueous base and acid solutions were pumped through the system at a constant flow rate of 60 gallons per minute throughout the wash. Examples of use of the method of the present invention in the above apparatus are described below. The time stated is the number of minutes during which the solution was pumped into the apparatus and the pH stated is the average pH of the solution during each wash step.

EXAMPLE I

| Time | Wash Solution | Average pH |
|---|---|---|
| 45 minutes | NaOH | pH 11.6 |
| 120 minutes | $HNO_3$ | pH 0.7 |
| 180 minutes | NaOH | pH 11.1 |
| 125 minutes | $HNO_3$ | pH 2.2 |

Result: 635.9 lbs. of scale removed.

EXAMPLE II

| Time | Wash Solution | Average pH |
|---|---|---|
| 90 minutes | NaOH | pH 10.7 |
| 70 minutes | $HNO_3$ | pH 3.0 |
| 80 minutes | $HNO_3$ | pH 0.6 |
| 110 minutes | NaOH | pH 10.1 |

Result: 5,036.5 lbs. of scale removed.

EXAMPLE III

| Time | Wash Solution | Average pH |
|---|---|---|
| 60 minutes | NaOH | pH 11.3 |
| 95 minutes | $HNO_3$ | pH 1.7 |
| 110 minutes | NaOH | pH 11.3 |
| 100 minutes | $HNO_3$ | pH 4.1 |

Result: 725.9 lbs. of scale removed.

EXAMPLE IV

| Time | Wash Solution | Average pH |
|---|---|---|
| 60 minutes | $HNO_3$ | pH 1.0 |
| 65 minutes | NaOH | pH 11.4 |

-continued

| Time | Wash Solution | Average pH |
|---|---|---|
| 100 minutes | HNO₃ | pH 1.0 |
| 80 minutes | HNO₃ | pH 2.6 |

Result: 2574.8 lbs. of scale removed.

EXAMPLE V

| Time | Wash Solution | Average pH |
|---|---|---|
| 45 minutes | NaOH | pH 11.9 |
| 60 minutes | HNO₃ | pH 1.4 |
| 137 minutes | NaOH | pH 11.8 |
| 173 minutes | HNO₃ | pH 2.1 |

Result: 267.6 lbs. of scale removed.

EXAMPLE VI

| Time | Wash Solution | Average pH |
|---|---|---|
| 30 minutes | NaOH | pH 11.8 |
| 75 minutes | HNO₃ | pH 1.0 |
| 140 minutes | NaOH | pH 11.6 |
| 130 minutes | HNO₃ | pH 2.7 |

Result: 580.8 lbs. of scale removed.

The effectiveness of the method in terms of total quantity of inorganic scale removed varied in the above examples for various reasons, such as the length of time between scale removal operations, type of scale to be removed and other factors. The most effective example is Example II above wherein an extended NaOH wash of 90 minutes was followed by an extended HNO₃ wash for 150 minutes which was followed by a 110 minute NaOH wash. The use of the reaction vessel for waste fluid treatment preceded the wash procedure of Example II by approximately two weeks while some of the other wash examples were preceded by shorter waste fluid processing in the reaction vessel.

The total amount of scale removed in pounds, total distribution in percent and quantity in pounds of each component of the scale soluble in NaOH and HNO₃ for each of the above examples is shown on the following Tables I–VI.

TABLE I

AMOUNT OF SCALE REMOVED, TOTAL DISTRIBUTION AND DISTRIBUTION OF EACH COMPONENT IN CAUSTIC AND ACID

|  | Total lbs | % Dist'n | NaOH Soluble (lbs.) | % NaOH Soluble | HNO₃ Soluble (lbs.) | % HNO₃ Soluble |
|---|---|---|---|---|---|---|
| Ca | 260.3 | 40.9 | 1.6 | 0.6 | 258.7 | 99.4 |
| Al | 39.1 | 6.1 | 21.9 | 56.0 | 17.2 | 44.0 |
| Mg | 30.7 | 4.8 | 0.6 | 2.0 | 30.1 | 98.0 |
| Si | 3.3 | 0.5 | 0.6 | 18.2 | 2.7 | 81.8 |
| SO₄ | 49.5 | 7.8 | 16.9 | 34.1 | 32.6 | 65.9 |
| F | 11.3 | 1.8 | 0.9 | 8.0 | 10.4 | 92.0 |
| PO₄ | 241.7 | 38.0 | 23.8 | 9.8 | 217.9 | 90.2 |
|  | 635.9 | 99.9 | 66.3 |  | 569.6 |  |

TABLE II

AMOUNT OF SCALE REMOVED, TOTAL DISTRIBUTION AND DISTRIBUTION OF EACH COMPONENT IN CAUSTIC AND ACID

|  | Total lbs | % Dist'n | NaOH Soluble (lbs.) | % NaOH Soluble | HNO₃ Soluble (lbs.) | % HNO₃ Soluble |
|---|---|---|---|---|---|---|
| Ca | 1,402.2 | 27.8 | 81.4 | 5.8 | 1,320.8 | 94.2 |
| Mg | 219.6 | 4.4 | 12.9 | 5.9 | 206.7 | 94.1 |
| Al | 740.1 | 14.7 | 619.9 | 83.8 | 120.2 | 16.2 |
| Si | 22.2 | 0.4 | 2.0 | 9.0 | 20.2 | 91.0 |
| F | 74.5 | 1.5 | 22.2 | 29.8 | 52.3 | 70.2 |
| SO₄ | 924.0 | 18.3 | 647.9 | 70.1 | 276.1 | 29.9 |
| PO₄ | 1,653.9 | 32.8 | 467.7 | 28.3 | 1,186.2 | 71.7 |
|  | 5,063.5 | 99.9 | 1,854.0 |  | 3,182.5 |  |

TABLE III

AMOUNT OF SCALE REMOVED, TOTAL DISTRIBUTION AND DISTRIBUTION OF EACH COMPONENT IN CAUSTIC AND ACID

|  | Total lbs | % Dist'n | NaOH Soluble (lbs.) | % NaOH Soluble | HNO₃ Soluble (lbs.) | % HNO₃ Soluble |
|---|---|---|---|---|---|---|
| Ca | 195.9 | 27.0 | 1.4 | 0.7 | 194.5 | 99.3 |
| Mg | 23.7 | 3.3 | 0.3 | 1.3 | 23.4 | 98.7 |
| Al | 70.8 | 9.8 | 54.8 | 77.4 | 16.0 | 22.6 |
| Si | 6.3 | 0.9 | 2.0 | 31.7 | 4.3 | 68.3 |
| F | 10.0 | 1.4 | 2.2 | 22.0 | 7.8 | 78.0 |
| SO₄ | 24.3 | 3.3 | 11.2 | 46.1 | 13.1 | 53.9 |
| PO₄ | 394.9 | 54.4 | 109.4 | 27.7 | 285.5 | 72.3 |
|  | 725.9 | 100.1 | 181.3 |  | 544.6 |  |

TABLE IV

AMOUNT OF SCALE REMOVED, TOTAL DISTRIBUTION AND DISTRIBUTION OF EACH COMPONENT IN CAUSTIC AND ACID

|  | Total lbs | % Dist'n | NaOH Soluble (lbs.) | % NaOH Soluble | HNO₃ Soluble (lbs.) | % HNO₃ Soluble |
|---|---|---|---|---|---|---|
| Ca | 967.8 | 37.6 | 24.6 | 2.5 | 943.2 | 97.5 |
| Mg | 90.9 | 3.5 | 2.6 | 2.9 | 88.3 | 97.1 |
| Al | 116.3 | 4.5 | 54.9 | 47.2 | 61.4 | 52.8 |
| Si | 19.3 | 0.7 | 0.8 | 4.2 | 18.5 | 95.9 |
| PO₄ | 709.9 | 27.6 | 52.2 | 7.4 | 657.7 | 92.6 |
| SO₄ | 629.9 | 24.5 | 223.1 | 35.4 | 406.8 | 64.6 |
| F | 40.7 | 1.6 | 1.4 | 3.4 | 39.3 | 96.6 |
|  | 2,574.8 | 100.0 | 359.6 |  | 2,215.2 |  |

TABLE V

AMOUNT OF SCALE REMOVED, TOTAL DISTRIBUTION AND DISTRIBUTION OF EACH COMPONENT IN CAUSTIC AND ACID

|  | Total lbs | % Dist'n | NaOH Soluble (lbs.) | % NaOH Soluble | HNO₃ Soluble (lbs.) | % HNO₃ Soluble |
|---|---|---|---|---|---|---|
| Ca | 59.6 | 22.3 | 0.7 | 1.2 | 58.9 | 98.8 |
| Mg | 2.0 | 0.7 | 0.1 | 5.0 | 1.9 | 59.0 |
| Al | 31.1 | 11.6 | 24.2 | 77.8 | 6.9 | 22.2 |
| Si | 1.2 | 0.4 | 0.5 | 41.7 | 0.7 | 58.3 |
| PO₄ | 51.4 | 19.2 | 25.2 | 49.0 | 26.2 | 51.0 |
| SO₄ | 120.4 | 45.0 | 58.6 | 48.7 | 61.8 | 51.3 |
| F | 1.9 | 0.7 | 0.4 | 21.2 | 1.5 | 78.9 |
|  | 267.6 | 99.9 | 109.7 |  | 157.9 |  |

TABLE VI
AMOUNT OF SCALE REMOVED, TOTAL DISTRIBUTION AND DISTRIBUTION OF EACH COMPONENT IN CAUSTIC

|     | Total lbs. | % Dist'n | NaOH Soluble (lbs.) | % NaOH Soluble | $HNO_3$ Soluble (lbs.) | % $HNO_3$ Soluble |
|---|---|---|---|---|---|---|
| Ca | 124.8 | 21.5 | 0.4 | 0.3 | 124.4 | 99.7 |
| Mg | 9.7 | 1.7 | — | — | 9.7 | 100.0 |
| Al | 54.8 | 9.4 | 50.6 | 92.3 | 4.2 | 7.7 |
| Si | 6.3 | 1.1 | 1.0 | 15.9 | 5.3 | 84.1 |
| $PO_4$ | 153.0 | 26.3 | 45.6 | 29.8 | 107.4 | 70.2 |
| $SO_4$ | 228.8 | 39.4 | 157.3 | 68.8 | 71.5 | 31.2 |
| F | 3.4 | 0.6 | 0.6 | 17.6 | 2.8 | 82.4 |
|   | 580.8 | 100.0 | 254.9 |   | 325.3 |   |

The above data shows the preferential removal of sulfate during the caustic wash resulting from the conversion of anhydrite to calcium hydroxide. Aluminum is also primarily removed during the caustic wash step. Removal of calcium, magnesium, phosphate and fluoride occurs primarily during the acid wash step.

To increase the effectiveness of the acid and base wash solutions, a water rinse step should be performed between successive steps. Water rinse may also be used after the interruption of the fluid waste stream flow just prior to the acid and base wash scale removal steps and before recommencing the waste stream flow. The water rinse may be potable water, however, it has been found that by using buffered water, in particular the effluent of the fluid treatment system, there is less redeposition of scale on the fluid treatment apparatus surfaces. This is due to the fact that the potable water includes calcium and other ions that may restart scale formation while the buffered water, or effluent, has a lower concentration of ions which may reform scale on the fluid treatment apparatus.

Other acids that may be used in the removal of scale include formic acid or propionic acid and possibly citric acid. The temperature of the acid wash in the reaction zone should be approximately 400° F. to 500° F. and the acid may be preheated to improve performance in the portions of the fluid treatment apparatus above the reaction zone.

The method of removing scale by providing alternate forward and backward flow through the reaction vessel is further described and illustrated in the example below.

| Alternate Forward and Backward Flow of Caustic and Acid Wash | | |
|---|---|---|
| Inlet Fluid | Direction | Flow Time (min) |
| NaOH (10%) | forward | 70 |
| Water | forward | 60 (water flow until caustic starts exiting vessel, then reverse flow) |
| Water | reverse | 17 |
| $HNO_3$ (10%) | reverse | 130 |
| Water | reverse | 120 (water flow in reverse direction until acid sampled for 80 minutes) |
| $HNO_3$ | forward | 50 |
| Water | forward | 3 |
| NaOH | forward | 8 |
| Water | forward | 180 (water flow until last of pull out of reaction vessel) |

| Amount of Scale Removed Using Alternatie Flow of Caustic and Acid | | | | |
|---|---|---|---|---|
|   | Caustic | Acid | Acid | Caustic |
| Ca (mg/l) | 146 | 23000 | 6980 | 143 |
| Mg (mg/l) | 32 | 1245 | 153 | 17.5 |
| Al (mg/l) | 4293 | 2076 | 1744 | 990 |
| Fe (mg/l) | 4.8 | 166 | 324 | 12.9 |
| Phosphate (mg/l) | 3260 | 14350 | 1085 | 2000 |
| Sulfate (mg/l) | 5480 | 445 | 4000 | 45 |
| Fluoride (mg/l) | 330 | 260 | 25 | 5 |
| Si (mg/l) | 63.9 | 404 | 132 | 31 |

Result: 3,598 lbs. of scale removed.

Having described the preferred method of the present invention, it will be understood that various modifications may be made to the invention disclosed herein within the purview of the appended claims. As described, the method may be used with various fluid treatment apparatus and may be applied to different types of slurries, however, the inventions are particularly adapted for use in vertical tube wet oxidation reaction fluid treatment apparatus such as may be used for wet oxidation of municipal wastewater sludge.

I now claim the invention as follows:

1. A method of removing inorganic and organic scales from surfaces of a vertical tube reaction apparatus having a plurality of concentric tubes extending vertically downward into the earth to a depth exceeding 3,000 feet in which a waste stream enters the apparatus in an influent flow and exits the apparatus in an effluent flow, said waste stream undergoes a chemical reaction as it is subjected to pressures and temperatures which increase with the depth of the fluid waste stream in the tubes and which also results in scale build-up comprising substances having retrograde solubility on the surface of the tubes as a function of the increase in temperature and pressure of the waste stream in the influent flow and effluent flow, said method comprising the steps of:

(a) interrupting the influent flow of the waste stream into the vertical tube reaction apparatus;

(b) circulating a quantity of an aqueous base solution through the vertical tube reaction apparatus to form a column of said aqueous base solution which exerts a selected fluid pressure and which contacts said scale with said aqueous base solution under the pressure of said column to convert a layer of scale into an acid soluble layer;

(c) circulating a quantity of an aqueous acid solution through the vertical tube reaction apparatus to form a column of said aqueous acid solution which exerts a selected fluid pressure and which contacts said scale with said aqueous solution under the pressure of said column to dissolve the acid soluble layer; and (d) resuming the influent flow of the waste stream into the vertical tube reaction apparatus.

2. The method of claim 1 further comprising the steps following step (c) of recirculating an aqueous base solution through the vertical tube reaction apparatus to convert a second layer of scale into a second acid soluble layer; and recirculating an aqueous acid solution through the vertical tube reaction aparatus to dissolve the second acid soluble layer.

3. The method of claim 1 wherein said inorganic scales comprise mineral carbonates, anhydrite and complex silicates which form the scale on the surfaces of the fluid treatment apparatus.

4. The method of claim 3 wherein said aqueous base solution converts the anhydrite into calcium hydroxide and removes deposits of complex silicates, and said aqueous acid solution removes the calcium hydroxide formed by the base solution and removes deposits of mineral carbonates.

5. The method of claim 1 further comprising circulating water through the fluid treatment apparatus between successive steps.

6. The method of claim 5 wherein the water circulated through the fluid treatment apparatus between successive steps is buffered water.

7. The method of claim 1 wherein said aqueous acid solution comprises water and a strong mineral acid selected from the group consisting essentially of: nitric acid; hydrochloric acid; sulfuric acid; perchloric acid; and, combinations thereof.

8. The method of claim 7 wherein said mineral acid is nitric acid.

9. The method of claim 1 wherein said aqueous base solution is selected from the group consisting essentially of aqueous sodium hydroxide and aqueous potassium hydroxide.

10. A method of removing inorganic and organic scale from surfaces of a vertical tube reaction apparatus having a plurality of concentric tubes extending vertically downward into the earth to a depth exceeding 3,000 feet in which a waste stream enters the apparatus in an influent flow and exits the apparatus in an effluent flow, said waste stream undergoes a chemical reaction as it is subjected to pressures and temperatures which increase with the depth of the fluid waste stream in the tubes and which also results in scale build-up comprising substances having retrograde solubility on the surface of the tubes as a function of the increase in temperature and pressure of the waste stream in the influent flow and effluent flow, said method comprising the steps of:
 (a) interrupting the influent flow of the waste stream into the vertical tube reaction apparatus;
 (b) circulating a quantity of an aqueous base solution partially through the vertical tube reaction apparatus to form a column of said aqueous base solution solution which exerts a selected fluid pressure and which contacts said scale with said aqueous base solution solution under the pressure of said column to dissolve organic matter from the tubes;
 (c) circulating an aqueous base solution through the vertical tube reaction apparatus to form a column of said aqueous base solution which exerts a selected fluid pressure and which contacts said scale with said aqueous acid solution under the pressure of said column to convert a layer of scale into an acid soluble layer;
 (d) circulating a quantity of an aqueous acid solution partially through the vertical tube reaction apparatus to form a column of said aqueous acid solution which exerts a selected fluid pressure and which contacts said scale with said aqueous acid solution under the pressure of said column to dissolve the acid soluble layer; and
 (e) resuming the influent flow of the waste stream into the vertical tube reaction apparatus.

11. The method of claim 10 further comprising the steps following step (d) of recirculating an aqueous base solution through the vertical tube reaction apparatus to convert a second layer of scale into a second acid soluble layer; and recirculating an aqueous acid solution through the vertical tube reaction apparatus to dissolve the second acid soluble layer.

12. The method of claim 10 wherein said inorganic scales comprise mineral carbonates, anhydrite and complex silicates which form the scale on the surfaces of the fluid treatment apparatus.

13. The method of claim 12 wherein said aqueous base solution converts the anhydrite into calcium hydroxide and removes deposits of complex silicates, and said aqueous acid solution removes the calcium hydroxide formed by the base solution and removes deposits of mineral carbonates.

14. The method of claim 10 further comprising circulating water through the fluid treatment apparatus between successive steps.

15. The method of claim 14 wherein the water circulated through the fluid treatment apparatus between successive steps is buffered water.

16. The method of claim 10 wherein said aqueous acid solution comprises water and a strong mineral acid selected from the group consisting essentially of: nitric acid; hydrochloric acid; sulfuric acid; perchloric acid; and, combinations thereof.

17. The method of claim 16 wherein said mineral acid is nitric acid.

18. The method of claim 10 wherein said aqueous base solution is selected from the group consisting essentially of aqueous sodium hydroxide and aqueous potassium hydroxide.

19. A method of removing scales from surfaces of a vertical tube reaction apparatus having a plurality of concentric tubes extending vertically downward into the earth to a depth exceeding 3,000 feet in which a waste stream enters the apparatus in an influent flow and exits the apparatus in an effluent flow and said waste stream undergoes a chemical reaction as it is subjected to pressures and temperatures which increase with the depth of the fluid waste stream in the tubes and which also results in scale build-up, said method comprising the steps of:
 (a) interrupting the influent flow of the waste stream into the vertical tube reaction apparatus;
 (b) circulating a quantity of an aqueous base solution in a first direction through the vertical tube reaction apparatus to form a column of said aqueous base solution which exerts a selected fluid pressure and which contacts said scale with said aqueous base solution under the pressure of said column to convert a layer of scale into an acid soluble layer;
 (c) circulating a quantity of an aqueous acid solution in said first direction through the vertical tube reaction apparatus to form a column of said aqueous acid solution which exerts a selected fluid pressure and which contacts said scale with said aqueous acid solution under the pressure of said column following said aqueous base solution to dissolve the acid soluble layer;
 (d) recirculating said aqueous acid solution through the vertical tube reaction apparatus in a second direction opposite to said first direction to further dissolve the acid soluble layer;
 (e) recirculating said aqueous base solution in said second direction through said vertical tube reaction apparatus following said aqueous acid solution; and
 (f) resuming the influent flow of the waste stream into the vertical tube reaction apparatus.

20. The method of claim 19 further comprising circulating water through the apparatus between successive steps.

21. A method of removing scale and accumulations of organic materials from a vertical tube reaction apparatus having a plurality of concentric tubes extending vertically downward into the earth to a depth exceeding 3,000 feet in which a waste stream enters the apparatus in an influent flow and exits the apparatus in an effluent flow and said waste stream undergoes a chemical reaction as it is subjected to pressures and temperatures which increase with the depth of the fluid waste stream in the tubes, said method comprising the steps of:
 (a) interrupting the influent flow of the waste stream into the vertical tube reaction apparatus;
 (b) pumping an aqueous base solution into the vertical tube reaction apparatus and heating said base solution to about the temperature in a reaction zone located adjacent the lower extent of said reaction apparatus to form a column of heated aqueous base solution which exerts a selected fluid pressure and which contacts said scale and said accumulations of organic materials under the pressure of said column to dissolve said scale and organic matter from the tubes;
 (c) pumping said aqueous base solution out of the vertical tube reaction apparatus in a second opposite direction to remove the aqueous base solution and dissolved salts and organic matter; and
 (d) resuming the influent flow of the waste stream into the vertical tube reaction apparatus.

22. A method of removing scale and organic matter from the interior walls of a vertical tube reaction apparatus of the type in which an assembly of concentric tubes extend into the earth to a depth exceeding 3,000 feet, said assembly of tubes defining first and second flow passages in flow communication with one another and through which diluted municipal waste is flowed to form a hydrostatic fluid column of said waste which exerts a selected fluid pressure in a reaction zone in the lower portion of one of said first and second flow passages and wherein said reaction apparatus includes a heat-exchanger by which said fluid column of waste is heated in siad reaction apparatus to a temperature sufficient to bring about a reaction of said waste with another substance such as gaseous oxygen which is added to said waste in said reaction apparatus, said reaction forming an effluent which includes buffered water and wherein effluent is flowed through the other of said flow passages and out of said reaction apparatus, the method comprising the steps of:
 (a) interrupting the flow of said diluted municipal waste into said one of said flow passages;
 (b) flowing a quantity of an aqueous base solution into said one of said flow passages to form at least one column of said aqueous base solution which exerts a selected fluid pressure and which contacts said scale and said organic matter with said aqueous acid solution under the pressure of said column of said aqueous base solution;
 (c) elevating the temperature of said column of said aqueous base solution to between 300° F. and 600° F. to convert a layer of said scale into an acid-soluble layer;
 (d) interrupting the flow of said aqueous base solution into said one of said flow passages;
 (e) flowing a quantity of an aqueous acid solution into said one of said flow passages to form at least one column of said aqueous acid solution which exerts a selected fluid pressure and which contacts said acid-soluble layer with said aqueous acid solution under the pressure of said column of said aqueous acid solution;
 (f) elevating the temperature of said column of said aqueous acid solution to between 500° F. to 600° F. to dissolve said acid soluble layer;
 (g) interrupting the flow of said aqueous acid solution into said one of said flow passages; and
 (h) resuming the flow of said diluted municipal waste into said one of said flow passages.

23. The method of removing scale and organic matter from the interior walls of a vertical tube reaction apparatus recited in claim 22, further including the steps of separating said buffered water from said effluent, flowing one portion of said buffered water through said one of said flow passages after step (d), and flowing another portion of said buffered water through said one of said flow passages after step (h).

* * * * *